US007280338B2

(12) United States Patent
Juds et al.

(10) Patent No.: US 7,280,338 B2
(45) Date of Patent: Oct. 9, 2007

(54) POWER SUPPLY CIRCUIT, BACK-PACK POWER SUPPLY MODULE AND CIRCUIT INTERRUPTER INCLUDING THE SAME

(75) Inventors: Mark A. Juds, New Berlin, WI (US); Joseph C. Engel, Monroeville, PA (US); Ian T. Wallace, Whitefish Bay, WI (US); Steven C. Schmalz, Franklin, WI (US)

(73) Assignee: Eaton Corporation, Cleveland, OH (US)

( * ) Notice: Subject to any disclaimer, the term of this patent is extended or adjusted under 35 U.S.C. 154(b) by 117 days.

(21) Appl. No.: 11/127,564

(22) Filed: May 12, 2005

(65) Prior Publication Data

US 2006/0256470 A1 Nov. 16, 2006

(51) Int. Cl.
*H02H 1/00* (2006.01)

(52) U.S. Cl. ........................................ 361/120; 361/94

(58) Field of Classification Search ................. 361/120
See application file for complete search history.

(56) References Cited

U.S. PATENT DOCUMENTS

| | | | | |
|---|---|---|---|---|
| 4,188,002 A * | 2/1980 | Gilcher | 346/34 R |
| 5,420,799 A | 5/1995 | Peterson et al. | 364/483 |
| 5,548,523 A | 8/1996 | Wehrli, III et al. | 364/483 |
| 5,585,611 A * | 12/1996 | Harvey et al. | 218/155 |
| 5,644,463 A * | 7/1997 | El-Sharkawi et al. | 361/94 |
| 5,747,943 A * | 5/1998 | Houk et al. | 315/225 |
| 5,859,398 A * | 1/1999 | McKean | 218/7 |
| 6,930,271 B1 * | 8/2005 | Palmieri et al. | 218/154 |
| 2005/0063107 A1 | 3/2005 | Benke | 361/2 |

* cited by examiner

*Primary Examiner*—Michael Sherry
*Assistant Examiner*—Luis E. Román
(74) *Attorney, Agent, or Firm*—Martin J. Moran

(57) ABSTRACT

A back-pack power supply module is for a circuit interrupter including an elongated line conductor. The back-pack power supply module includes a housing having an opening therethrough. The opening receives the elongated line conductor, which passes through the opening. A power supply circuit is housed by the housing and is adapted to input a line voltage from the elongated line conductor and output direct current voltages. A capacitive divider circuit includes two capacitors electrically connected in series between a first terminal and an output of the capacitive divider circuit. One of these two capacitors receives the line voltage. The two capacitors are embedded in insulation within one portion of the housing. Another capacitor is electrically connected between a second terminal and the capacitive divider circuit output. The other capacitor is disposed in another portion of the housing opposite the opening.

1 Claim, 3 Drawing Sheets

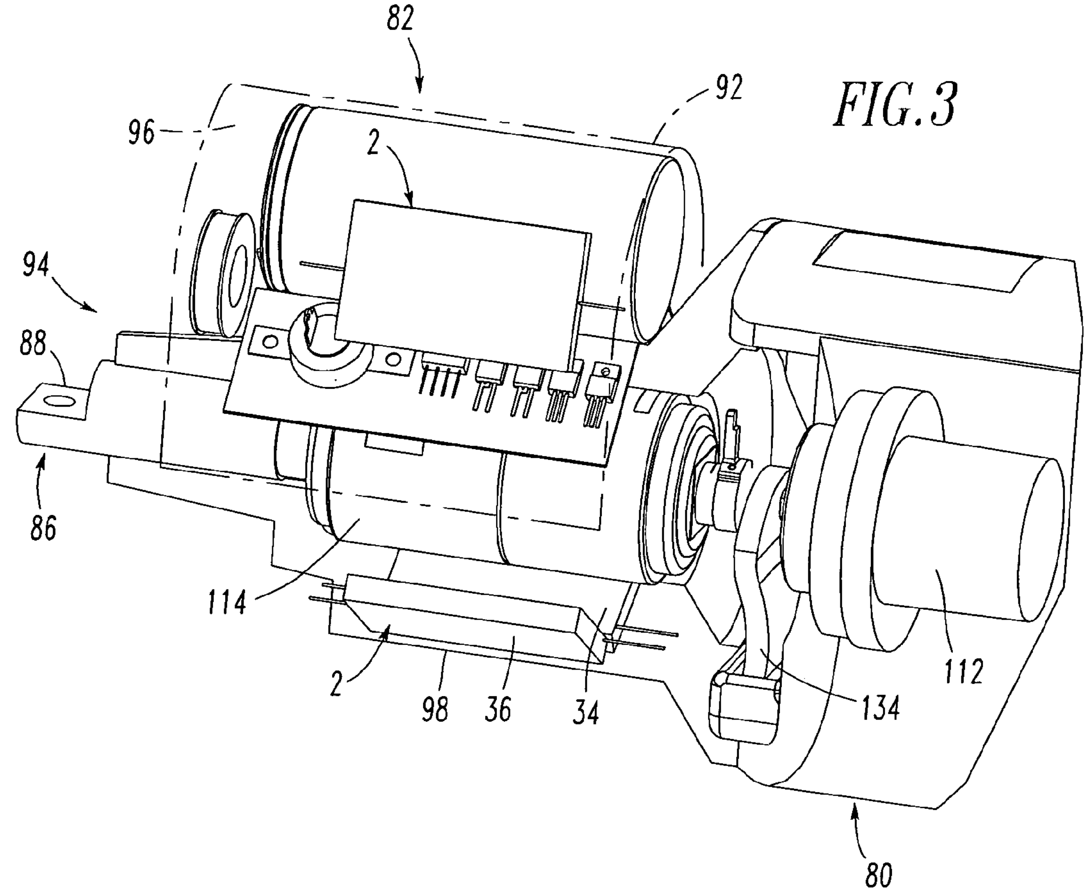
FIG. 3
FIG. 4
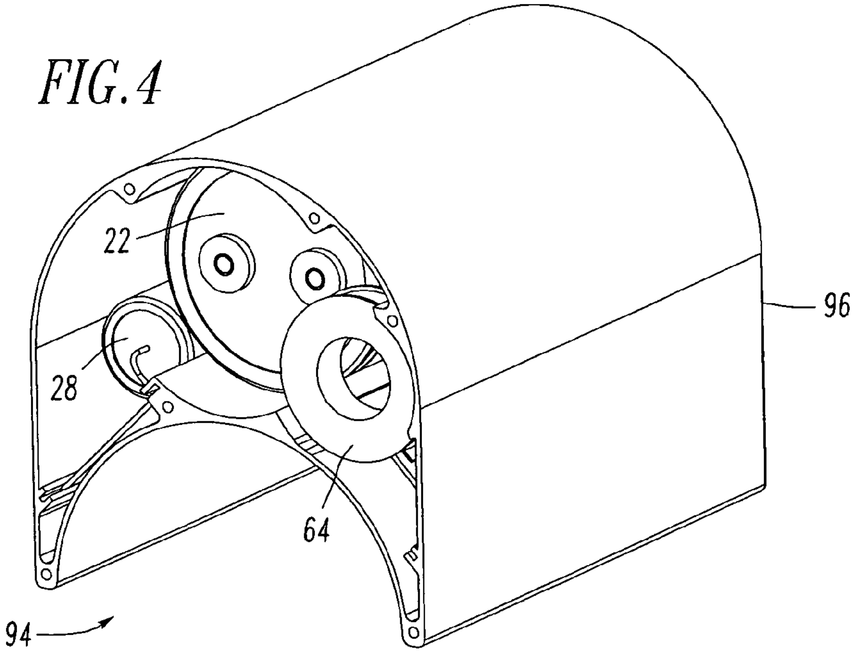

POWER SUPPLY CIRCUIT, BACK-PACK POWER SUPPLY MODULE AND CIRCUIT INTERRUPTER INCLUDING THE SAME

BACKGROUND OF THE INVENTION

1. Field of the Invention

This invention pertains generally to power supplies and, more particularly, to power supplies for circuit interrupters. The invention also relates to circuit interrupters and, more particularly, to vacuum circuit breakers.

2. Background Information

Circuit interrupters, such as circuit breakers, provide protection for electrical systems from electrical fault conditions such as, for example, current overloads, short circuits and abnormal voltage conditions. Typically, circuit breakers include a spring powered operating mechanism, which opens electrical contacts to interrupt the current through the conductors of the electrical system in response to abnormal conditions.

Vacuum circuit breakers employ separable main contacts disposed within an insulating housing. Generally, one of the contacts is fixed relative to both the housing and to an external electrical conductor, which is interconnected with the protected circuit. The other contact is movable. The movable contact assembly usually comprises a stem of circular cross-section. At one end, the movable contact is enclosed within a vacuum chamber and, at the other end, a driving mechanism is external to the vacuum chamber. An operating rod assembly comprising a push rod, which is fastened to the end of the stem opposite the movable contact, and the driving mechanism provide the motive force to move the movable contact into or out of engagement with the fixed contact. The operating rod assembly is operatively connected to a latchable operating mechanism, which is responsive to an abnormal current condition. When an abnormal condition is reached, the latchable operating mechanism becomes unlatched, which causes the push rod to move to the open position.

Vacuum circuit interrupters are typically used, for instance, to reliably interrupt medium voltage alternating current (AC) currents and, also, high voltage AC currents of several thousands of amperes or more.

Medium voltage circuit interrupters operate at voltages of from about 1 kV to 38 kV. Such circuit interrupters, being relatively large and heavy, are mounted on trucks for insertion into and removal from metal enclosures or cabinets in which they are housed. As the circuit interrupter rolls fully into position within the enclosure, contact fingers engage stabs, which connect the circuit interrupter to line and load conductors. Withdrawal of the truck disconnects the circuit interrupter from all conductors, thereby assuring a safe condition for maintenance or removal.

Interruption of a medium/high voltage circuit advantageously requires a current interruption device that rapidly brings the current to zero upon the occurrence of a line fault. A “high” voltage fuse is of a type employed in electrical power distribution circuits typically carrying voltages of about 1 kV to 38 kV. Line faults at these high energy levels can cause extensive damage to circuit components and devices connected to the circuit, or to conductors and various other portions of the electrical energy distribution system. To minimize potential damage, fuses are employed with the intent to interrupt current flow quickly, following the onset of fault conditions involving high current loading, such as short circuit or overload faults.

U.S. Patent Application Publication No. 2005/0063107 discloses a medium voltage circuit interrupter in which an elongated housing, such as an elongated cylindrical housing, includes a first end supporting a first terminal, such as a line terminal, and an opposite second end supporting a second terminal, such as a load terminal. The elongated housing encloses a vacuum switch, a flexible conductor and an operating mechanism. The operating mechanism includes a current sensor sensing current passing between a movable contact assembly and the second terminal, and a trip unit responsive to the sensed current to move the movable contact assembly from the closed circuit position to the open circuit position. Each of the first and second terminals may include a termination structured to electrically connect to a line power cable or a load power cable, or a connector structured to electrically connect to a line power bus or a load power bus.

There is room for improvement in vacuum circuit interrupters.

There is also room for improvement in power supply circuits and in circuit interrupters including the same.

SUMMARY OF THE INVENTION

These needs and others are met by the present invention, which provides a power circuit to power, for example, a circuit breaker actuator, without the requirement of a separate power supply and power control wiring to the circuit breaker.

In accordance with one aspect of the invention, a power supply circuit comprises: a capacitive divider circuit including an input and an output, the input being adapted to input a first voltage, the output being adapted to output a second voltage which is substantially lower in magnitude than the first voltage, the first voltage and the second voltage being alternating current voltages; a full-wave rectifier including an input and an output, the input of the full-wave rectifier being adapted to input the second voltage of the output of the capacitive divider circuit; a first diode; a first capacitor electrically connected in series with the first diode, the series combination of the first diode and the first capacitor being electrically connected to the output of the full-wave rectifier; a first direct current output electrically connected to the first diode and the first capacitor; a second diode; a second capacitor electrically connected in series with the second diode, the series combination of the second diode and the second capacitor being electrically connected to the output of the full-wave rectifier; and a second direct current output electrically connected to the second diode and the second capacitor.

The input of the capacitive divider circuit may include a first terminal and a second terminal, and a transient suppression circuit may be electrically connected between the output of the capacitive divider circuit and the input of the full-wave rectifier. The transient suppression circuit may include a metal oxide varistor electrically connected between the output and the second terminal of the capacitive divider circuit. The transient suppression circuit may include an inductor electrically connected between the output of the capacitive divider circuit and the input of the full-wave rectifier.

The first and second direct current outputs may be adapted to power a closing coil and an opening coil, respectively, of a circuit interrupter.

As another aspect of the invention, a back-pack power supply module is for a circuit interrupter including an elongated line conductor having a line voltage. The back-pack power supply module comprises: a housing including an opening therethrough, the opening of the housing being adapted to receive the elongated line conductor of the circuit interrupter with the elongated line conductor passing through the opening of the housing; and a power supply circuit housed by the housing, the power supply circuit being adapted to input the line voltage of the elongated line conductor and output at least one direct current voltage.

The capacitive divider circuit may include a third capacitor, a fourth capacitor and a fifth capacitor. The third capacitor may be electrically connected in series with the fourth capacitor between a first terminal and the output of the capacitive divider circuit. The fifth capacitor may be electrically connected between the second terminal and the output of the capacitive divider circuit. The third and fourth capacitors may be embedded in insulation within the housing.

The housing may include a first portion and a second portion. The capacitive divider circuit may include at least one first capacitor adapted to receive the line voltage and a second capacitor. The at least one first capacitor may be embedded in insulation in the first portion of the housing and the second capacitor may be disposed in the second portion of the housing.

As another aspect of the invention, a vacuum circuit interrupter comprises: a first elongated line conductor including a line voltage; a load conductor; a vacuum switch comprising a vacuum envelope containing a fixed contact assembly and a movable contact assembly movable between a closed circuit position in electrical communication with the fixed contact assembly and an open circuit position spaced apart from the fixed contact assembly, the fixed contact assembly electrically interconnected with the first elongated line conductor; a second conductor electrically connecting the movable contact assembly with the load conductor; an operating mechanism moving the movable contact assembly between the closed circuit position and the open circuit position; a back-pack power supply module comprising: a housing including an opening therethrough, the first elongated line conductor passing through the opening of the housing, and a power supply circuit housed by the housing, the power supply circuit inputting the line voltage of the first elongated line conductor and outputting at least one direct current voltage to the operating mechanism; and an elongated housing including a first end supporting the first elongated line conductor and an opposite second end supporting the load conductor, the elongated housing enclosing the second conductor and the operating mechanism.

The first elongated line conductor may include a first side and an opposite second side. The capacitive divider circuit may include a third capacitor, a fourth capacitor and a fifth capacitor, the third capacitor being electrically connected in series with the fourth capacitor between the first terminal and the output of the capacitive divider circuit, the fifth capacitor being electrically connected between the second terminal and the output of the capacitive divider circuit.

The third and fourth capacitors may be embedded in insulation within the housing of the back-pack power supply module and may be located on the first side of the first elongated line conductor. The power supply circuit, except for the third and fourth capacitors, may be substantially located on the opposite second side of the first elongated line conductor.

BRIEF DESCRIPTION OF THE DRAWINGS

A full understanding of the invention can be gained from the following description of the preferred embodiments when read in conjunction with the accompanying drawings in which:

FIG. 3 is an isometric view of the back-pack power supply module of FIG. 2 as mounted proximate the line terminal of the circuit breaker.

FIG. 4 is an isometric view of the upper portion of the back-pack power supply module of FIG. 2.

DESCRIPTION OF THE PREFERRED EMBODIMENTS

As employed herein, the term "vacuum switch" expressly includes, but is not limited to, a "vacuum interrupter" and/or a "vacuum envelope".

The present invention is described in association with a power supply circuit for a medium voltage circuit breaker, although the invention is applicable to a wide range of line voltages and/or circuit interrupters such as, for example, circuit breakers, switches, and contactors, or to a power supply circuit for a voltage monitor or sensor.

Figure 1:
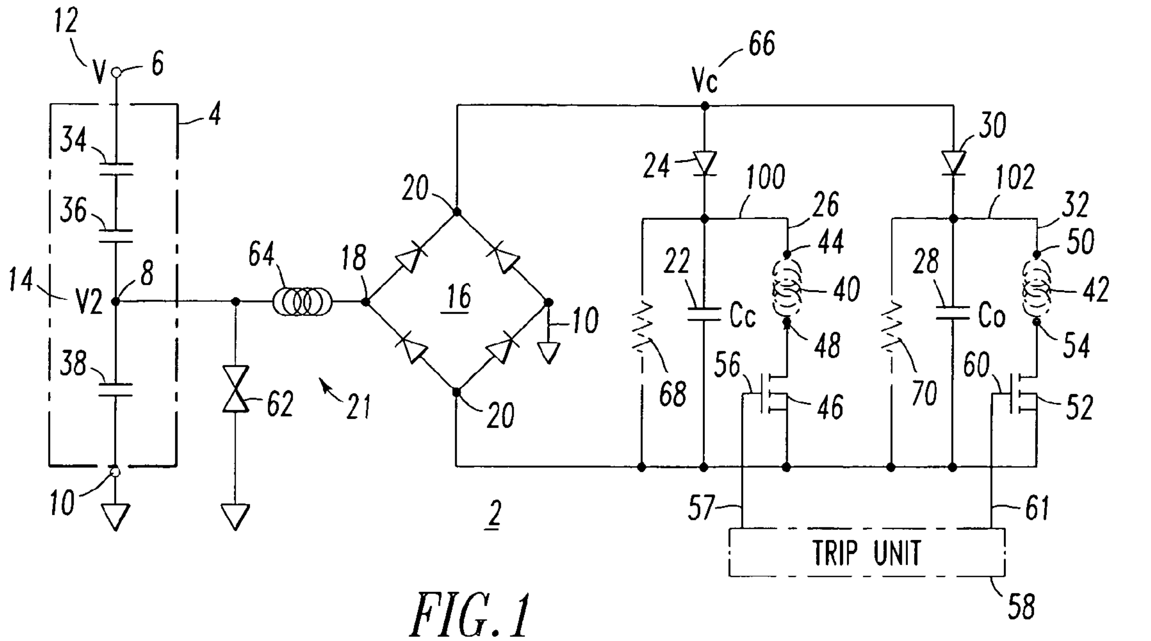
FIG. 1 is a schematic diagram of a power supply circuit in accordance with the present invention.

Referring to FIG. 1, a power supply circuit 2 includes a capacitive divider circuit 4 having a voltage input 6, an output 8 and a ground reference input 10. The input 6 is adapted to input an alternating current (AC) medium voltage (V) 12. The output 8 is adapted to output an AC voltage (V2) 14 which is substantially lower in magnitude than the medium voltage 12. The power supply circuit 2 also includes a full-wave rectifier 16 having an input 18 and an output 20. The full-wave rectifier input 18 is adapted to input the AC voltage 14 of the capacitive divider circuit output 8. A transient suppression circuit 21 is electrically connected between the capacitive divider circuit output 8 and the full-wave rectifier input 18. A capacitor (Cc) 22 is electrically connected in series with a diode 24. The series combination of the diode 24 and the capacitor 22 is electrically connected to the full-wave rectifier output 20. A direct current output 26 is electrically connected to the cathode of the diode 24 and to the capacitor 22. Another capacitor (Co) 28 is electrically connected in series with another diode 30. The series combination of the diode 30 and the capacitor 28 is also electrically connected to the full-wave rectifier output 20. Another direct current output 32 is electrically connected to the cathode of the diode 30 and to the capacitor 28.

The example capacitive divider circuit 4 includes three capacitors 34,36,38, which are electrically connected in series. The capacitive divider circuit inputs 6 and 10 may be, for example, a first terminal and a second terminal, respectively. The first capacitor 34 is electrically connected in series with the second capacitor 36 between the first terminal 6 and the capacitive divider circuit output 8. The third capacitor 38 is electrically connected between the second terminal 10 and the capacitive divider circuit output 8.

Figure 2:
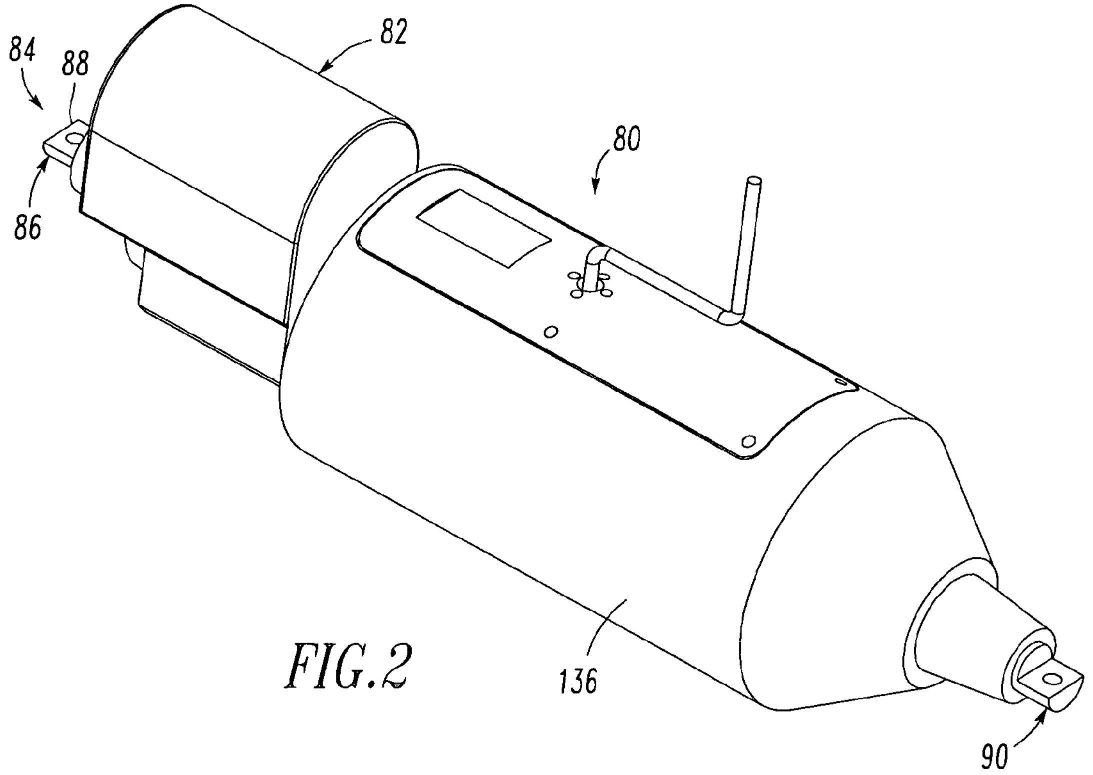
FIG. 2 is an isometric view of a single pole medium voltage circuit breaker including a back-pack power supply module having the power supply circuit of FIG. 1 at the line end of the circuit breaker.

The first direct current output 26 is adapted to power a closing coil 40 (shown in phantom line drawing) of a medium voltage circuit interrupter 80 (FIG. 2). The second direct current output 32 is adapted to power an opening coil 42 (shown in phantom line drawing) of the medium voltage circuit interrupter 80. The first direct current output 26 includes a first node 44 adapted to be electrically connected to the closing coil 40, a switch, such as FET 46, and a second node 48 adapted to be electrically connected to the closing coil 40. The second direct current output 32 includes a first node 50 adapted to be electrically connected to the opening coil 42, a switch, such as FET 52, and a second node 54 adapted to be electrically connected to the opening coil 42. The FET 46 includes a third node, such as gate 56, adapted to receive a control signal 57 from a trip unit 58 (shown in phantom line drawing). The FET 52 similarly includes a third node, such as gate 60, adapted to receive a control signal 61 from the trip unit 58. The FETs 46,52 are adapted to be selectively turned on by the trip unit control signals 57,61, in order that the capacitors 22,28 are then discharged through the coils 40,42, respectively.

The power supply circuit 2 is electrically connected to the suitable AC line voltage (V) 12 at input 6. The voltage 12 is suitably reduced at output 8 through the capacitors 34,36 and 38, which form the capacitive voltage divider 4. These capacitors 34,36,38 are suitably sized to produce a suitably reduced voltage (V2) 14 at output 8 relative to the medium voltage (V) 12 at input terminal 6. The reduced voltage (V2) 14 allows the use of relatively smaller and less expensive downstream components. A metal oxide varistor (MOV) 62 and an inductor 64 form the transient suppression circuit 21, which suppresses transients and protects the remainder of the power supply circuit 2, such as the full-wave rectifier 16 (e.g., to the right of FIG. 1), by suppressing transient voltage and current spikes before the output 20 with voltage (Vc) 66. For example, transient voltage and current spikes can occur with lightning strikes and will occur, for example, during impulse testing. The MOV 62 is electrically connected between the output 8 and the ground terminal 10 of the capacitive divider circuit 4. The inductor 64 is electrically connected between the capacitive divider circuit output 8 and the rectifier input 18.

The full wave rectifier 16, between the inductor 64 and the rectifier output 20, converts the AC power at capacitive divider circuit output 8 into pulsating direct current (DC) power at rectifier output 20. Resistors 68,70 (shown in phantom line drawing) represent the internal leakage current path of the capacitors 22,28, respectively. Those resistors 68,70 do not form a structure of the power supply circuit 2, but are representative of most capacitors, such as 22,28. The pulsating DC power at rectifier output 20 is sufficient to supply leakage current through the resistors 68,70, and to charge the actuator capacitors 22,28 in a suitable time. The circuit breaker trip unit 58 controls the FETs 46,52. When one of these FETs 46,52 is turned on, the corresponding one of the capacitors 22,28 discharges through the corresponding one of the actuator coils 40,42, respectively, to cause the circuit breaker actuator 108 (FIG. 5) to either close or open.

EXAMPLE 1

In this particular non-limiting example, the medium voltage (V) 12 is about 17.5 $kV_{RMS}$ at a suitable power line frequency (e.g., without limitation, 50 Hz; 60 Hz). The capacitors 34,36 are 0.01 μF, and the capacitor 38 is 0.33 μF. The resulting voltage (V2) 14 is about 261 volts RMS. The power supply circuit 2 functions under a wide range of operating conditions (e.g., without limitation, no charge on capacitors 22,28; charging; full charge; 17.5 $kV_{RMS}$ steady state; a 95 kV 1.2 μs pulse test condition).

EXAMPLE 2

As an alternative to Example 1, in which the two capacitors 34,36 are electrically connected in series, a single capacitor (not shown) having a suitable capacitance and voltage rating may be employed. Alternatively, other suitable parallel and/or series combinations of capacitors may be employed.

EXAMPLE 3

The MOV 62 prevents relatively high transient (e.g., momentary) values of voltage from reaching the circuit at, or downstream of, rectifier output 20. In this particular non-limiting example, the MOV 62 is rated at 275 $V_{RMS}$.

EXAMPLE 4

The inductor 64 prevents relatively large transient (e.g., momentary) values of current from reaching the rectifier output 20. In this particular non-limiting example, the inductor 64 has a value of 100 μH and uses 56 turns of 15 AWG wire. As a result, it is believed that the transient current can be reduced by a factor of about 1,000 at a 95 kV 1.2 μs pulse test condition.

EXAMPLE 5

Figure 5:
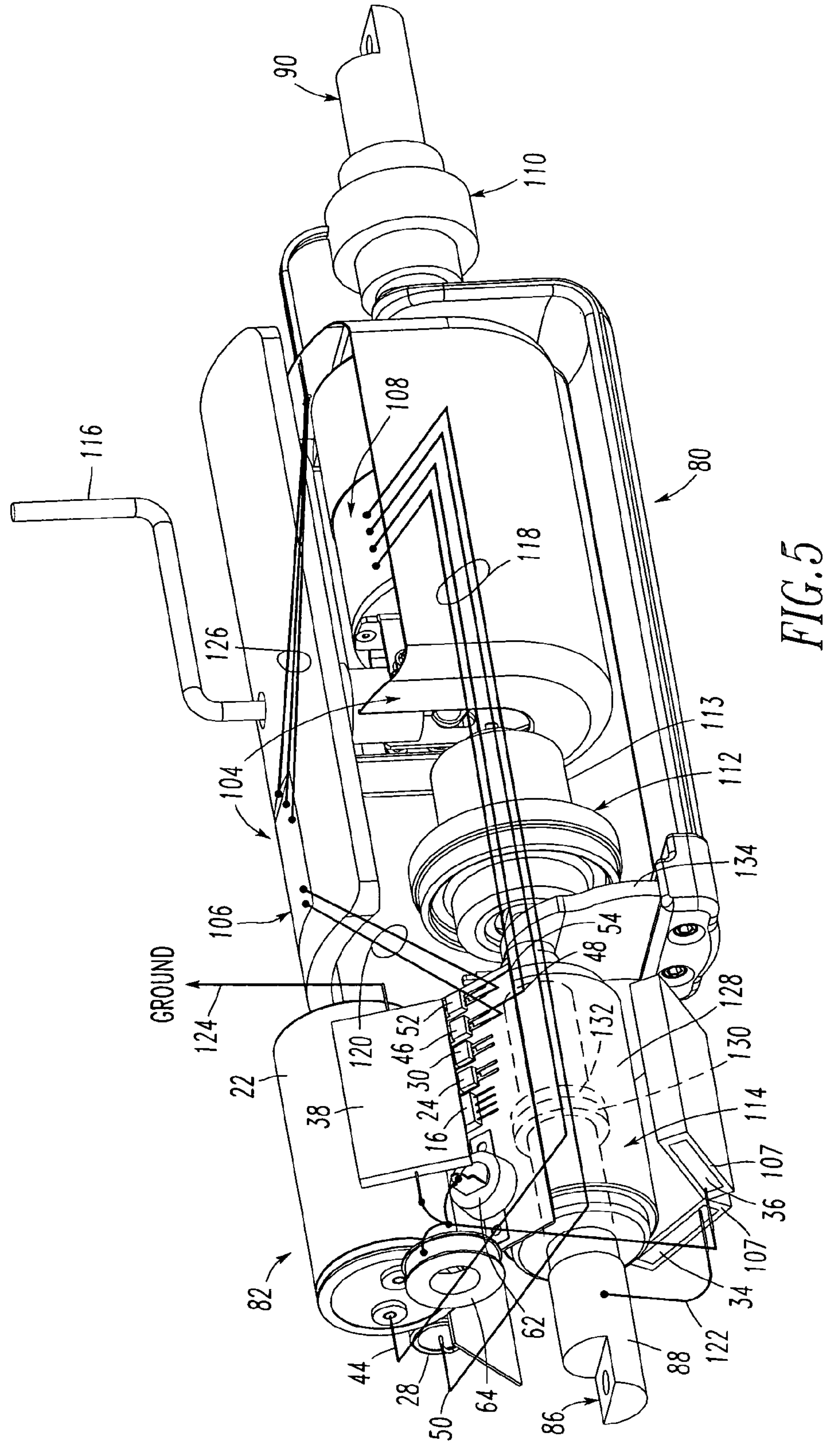
FIG. 5 is a simplified isometric view of the back-pack power supply module of FIG. 2 showing the electrical connections with the circuit breaker.

The capacitor (Cc) 22 stores the energy required to close the circuit breaker actuator 108 and the circuit breaker separable contacts 130,132 of FIG. 5 by energizing the closing coil 40. In this particular non-limiting example, the value of capacitor 22 is 450 μF.

EXAMPLE 6

The capacitor (Co) 28 stores the energy required to open the circuit breaker actuator 108 and the circuit breaker separable contacts 130,132 of FIG. 5 by energizing the opening coil 42. In this particular non-limiting example, the value of capacitor 28 is 5.6 μF.

Referring to FIG. 2, a single pole medium voltage circuit breaker 80 includes a back-pack power supply module 82 having the power supply circuit 2 of FIG. 1 at the line end 84 of the circuit breaker. The medium voltage circuit breaker 80 includes an elongated line conductor 86 (as best shown in FIG. 5) having a medium line voltage 88, and a load conductor 90. The module 82 is suitably coupled to the conductor 86 and/or to the circuit breaker 80 by suitable fastener(s) (e.g., without limitation, screw(s); bolt(s); clamp(s); adhesive) (not shown).

Referring to FIGS. 3 and 4, the back-pack power supply module 82 includes a housing 92 having an opening 94 therethrough as best shown with upper housing portion 96 of FIG. 4. The housing opening 94 receives the elongated line conductor 86 which passes through that opening (as best shown in FIG. 3). The power supply circuit 2 is housed by the upper housing portion 96 and by lower housing portion 98 (FIG. 3). As was discussed above in connection with FIG. 1, the power supply circuit 2 inputs the medium voltage 88 and outputs one or more DC voltages 100,102.

The upper and lower housing portions 96,98 are separated by the housing opening 94. The capacitors 34,36, which are electrically connected in series, are embedded in a suitable high voltage electrical insulation 107 and are located separately within the lower housing portion 98, in order to prevent breakdown to other components of the power supply circuit 2 within the upper housing portion 96. As shown in FIG. 5, the elongated line conductor 86 includes a first or lower (with respect to FIG. 5) side and an opposite or upper (with respect to FIG. 5) second side. The capacitors 34,36 are located on the first or lower side of the elongated line conductor 86, and the power supply circuit 2, except for those two capacitors 34,36, is substantially located on the opposite second or upper side of the elongated line conductor 86.

FIG. 5 shows a simplified view of the back-pack power supply module 82 including various electrical connections to the circuit breaker 80. For example, only the primary power and control electrical connections are shown, although a wide range of wiring layouts and routings may be employed for the same or other component locations. Suitable insulation (not shown) and spacing (not shown) are employed between the electrical conductors, in order to avoid potential breakdown to the medium voltage conductors of the circuit breaker 80.

The circuit breaker 80 includes an operating mechanism 104 having a trip unit 106 and a motor actuator 108, which includes the closing coil 40 and the opening coil 42 of FIG. 1. The first direct current output 26 (FIG. 1) selectively energizes the closing coil 40 and the second direct current output 32 selectively energizes the opening coil 42. A suitable module 110 combines a voltage sensor, a current sensor and a parasitic power supply for the trip unit 106. The motor actuator 108 drives a contact spring 112 (as shown within a suitable insulator 113) and a vacuum switch 114. A manual/emergency release mechanism 116 independently drives the contact spring 112 and vacuum switch 114.

Four power conductors 118 are electrically connected between the motor actuator 108 (closing coil 40 and opening coil 42) and the power supply circuit 2. Two control conductors 120 from the trip unit 106 provide the control signals 57,61 to the FET gates 56,60, in order to control the closing coil 40 and the opening coil 42. A conductor 122 electrically connects the capacitive divider voltage input 6 (FIG. 1) and the capacitor 34 to the elongated line conductor 86. Another conductor 124 electrically connects the capacitive divider ground input 10 (FIG. 1) and the capacitor 38, the MOV 62 and the rectifier 16 to an external ground reference. Three conductor pairs 126 (or three conductors and one or more suitable ground conductors) provide sensed voltage, sensed current, power and ground signals from the module 110 to the trip unit 106.

The vacuum switch 114 comprises a vacuum envelope 128 containing a fixed contact assembly 130 and a movable contact assembly 132 movable between a closed circuit position in electrical communication with the fixed contact assembly 130 (as shown in hidden line drawing in FIG. 5) and an open circuit position (not shown) spaced apart from the fixed contact assembly 130, which is electrically interconnected with the elongated line conductor 86. The vacuum switch 114 is, for example, a conventional vacuum interrupter (VI) (e.g., without limitation, a 3" VI bottle made by Eaton | Eaton Electrical, Inc. of Horseheads, N.Y.). The operating mechanism motor actuator 108 moves the movable contact assembly 132 between the closed circuit position and the open circuit position. A suitable shunt (e.g., a flexible conductor 134; a suitable conductive pivot, such as a double clinch joint) electrically connects the movable contact assembly 132 with the load conductor 90. An elongated housing 136 (FIG. 2) encloses the operating mechanism 104, the contact spring 112 and the flexible conductor 134. As shown in FIG. 3, the vacuum switch 114 and the elongated line conductor 86 are received by the opening 94 of the back-pack module housing 92.

It will be appreciated that the trip unit 106 may employ a combination of one or more of analog, digital and/or processor-based circuits.

The back-pack power supply module 82 and power supply circuit 2 provide power for the actuator 108 of the medium voltage circuit breaker 80 without requiring a separate power supply and power control wiring to the circuit breaker 80. The circuit breaker 80 may readily be installed by suitably electrically connecting the line and load terminals 86,90 to corresponding line and load cables (or power busses) (not shown). The parasitic back-pack power supply module 82 and power supply circuit 2 may be incorporated with the circuit breaker 80 by electrically connecting input terminals 6,10 to the elongated line conductor 86 and to an external ground reference (not shown). The power supply module 82 may output the AC voltage (V2) 14 to a suitable voltage monitor or sensor (not shown).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A vacuum circuit interrupter comprising:

a first elongated line conductor including a line voltage;

a load conductor;

a vacuum switch comprising a vacuum envelope containing a fixed contact assembly and a movable contact assembly movable between a closed circuit position in electrical communication with the fixed contact assembly and an open circuit position spaced apart from the fixed contact assembly, said fixed contact assembly electrically interconnected with said first elongated line conductor;

a second conductor electrically connecting said movable contact assembly with said load conductor;

an operating mechanism moving said movable contact assembly between the closed circuit position and the open circuit position;

a back-pack power supply module comprising:

a housing including an opening therethrough, said first elongated line conductor passing through the opening of said housing, and a power supply circuit housed by said housing, said power supply circuit inputting the line voltage of said first elongated line conductor and outputting at least one direct current voltage to said operating mechanism; and an elongated housing including a first end supporting said first elongated line conductor and an opposite second end supporting said load conductor, said elongated housing enclosing said second conductor and said operating mechanism;

wherein said power supply circuit comprises:

a first terminal electrically connected to said first elongated line conductor, a second terminal adapted to be electrically connected a ground conductor, a capacitive divider circuit including an input and an output, said input inputting said line voltage as a first voltage from said first terminal, said output outputting a second voltage which is substantially lower in magnitude than said first voltage, said first voltage and said second voltage being alternating current voltages, a full-wave rectifier including an input and an output, the input of said full-wave rectifier inputting said second voltage from the output of said capacitive divider circuit, a first diode, a first capacitor electrically connected in series with said first diode, the series combination of said first diode and said first capacitor being electrically connected to the output of said full-wave rectifier, a first direct current output electrically connected to said first diode and said first capacitor, a second diode, a second capacitor electrically connected in series with said second diode, the series combination of said second diode and said second capacitor being electrically connected to the output of said full-wave rectifier, and a second direct current output electrically connected to said second diode and said second capacitor;

wherein said first elongated line conductor includes a first side and an opposite second side; wherein said capacitive divider circuit includes a third capacitor, a fourth capacitor and a fifth capacitor, said third capacitor being electrically connected in series with said fourth capacitor between said first terminal and the output of said capacitive divider circuit, said fifth capacitor being electrically connected between said second terminal and the output of said capacitive divider circuit;

wherein said third and fourth capacitors are embedded in insulation within the housing of said back-pack power supply module and are located on the first side of said first elongated line conductor; and wherein said power supply circuit, except for said third and fourth capacitors, is substantially located on the opposite second side of said first elongated line conductor.

* * * * *